US006600313B1

(12) United States Patent
Atkins et al.

(10) Patent No.: US 6,600,313 B1
(45) Date of Patent: Jul. 29, 2003

(54) DEVICE FOR READING AN ELONGATE MAGNETIC DATA CARRIER

(75) Inventors: Kevin John Atkins, Swindon (GB); Ian Macdonald Green, London (GB)

(73) Assignee: Thorn Secure Science Limited, Swindon (GB)

( * ) Notice: Subject to any disclaimer, the term of this patent is extended or adjusted under 35 U.S.C. 154(b) by 0 days.

(21) Appl. No.: 10/088,802

(22) PCT Filed: Sep. 22, 2000

(86) PCT No.: PCT/GB00/03688

§ 371 (c)(1),
(2), (4) Date: Jul. 1, 2002

(87) PCT Pub. No.: WO01/22346

PCT Pub. Date: Mar. 29, 2001

(30) Foreign Application Priority Data

Sep. 24, 1999 (GB) ............................................. 9922517

(51) Int. Cl.⁷ .............................. G06K 7/08; G07D 7/04; G11B 5/127; G01R 33/12
(52) U.S. Cl. ........................ 324/234; 324/236; 194/317; 194/320; 235/449
(58) Field of Search ................................. 324/206, 210, 324/228, 234–239, 260–262; 235/449, 450; 194/210, 213, 317–320, 328; 209/534, 547, 567, 569

(56) References Cited

U.S. PATENT DOCUMENTS

| 3,753,255 | A | | 8/1973 | Di Veto |
| 4,328,519 | A | | 5/1982 | Way |
| 4,518,919 | A | * | 5/1985 | Ishida .................... 324/235 X |
| 5,096,038 | A | | 3/1992 | Potter et al. |
| 5,512,822 | A | | 4/1996 | Masuda |
| 6,073,845 | A | * | 6/2000 | Kawase ..................... 235/449 |
| 6,127,034 | A | | 10/2000 | Chorley |
| 6,310,475 | B1 | * | 10/2001 | Kawase et al. ............. 324/235 |

FOREIGN PATENT DOCUMENTS

| CA | 2049934 A1 | | 8/1991 |
| GB | 2035659 A | * | 6/1980 |
| GB | 2098768 A1 | | 11/1982 |

* cited by examiner

*Primary Examiner*—Gerard R. Strecker
(74) *Attorney, Agent, or Firm*—Martin Fleit; Paul D. Bianco; Fleit Kain Gibbons Gutman & Bongini P.L.

(57) ABSTRACT

A device for reading an elongate magnetic data carrier attached to or embedded in an article, having an active read head adapted to have a lateral extent greater than the width of the data carrier, preferably four times greater, such that the magnetic field produced by the read head results in a signal from the data carrier which has an amplitude which varies by less than 50% for head to data carrier spacings of from 0 to 60 microns. A wide read head can also make the reading of data more reproducible when reading narrow tracks using swipe readers, where precise alignment is difficult to achieve.

4 Claims, 2 Drawing Sheets

DEVICE FOR READING AN ELONGATE MAGNETIC DATA CARRIER

FIELD OF THE INVENTION

This invention relates to a device for reading an elongate magnetic data carrier attached to or embedded in an article. It relates particularly to active read heads of the type described in GB 2035659A for permanently structured magnetic tape such as WATERMARK (Registered Trade Mark), which is commercially obtainable from Thorn Secure Science Limited, Swindon, England.

BACKGROUND OF THE INVENTION

Active read heads of the above type provide an a/c energising electromagnetic field, and a detection circuit which is capable of reading data on data carriers such as for example printed magnetic patterns or WATERMARK tape. However, a disadvantage of such active read heads is that the detected signal falls off rapidly with distance if the spacing between the data carrier and the read head is increased. FIG. 1 shows experimental data indicating how the signal varies with spacing. This variation makes it difficult to read data when the spacing to the data carrier is uncertain, or known to vary. For example, some bank notes have magnetic threads embedded in them, as disclosed in WO 9819866A, the threads being exposed on the surface in some areas (windows) and buried under the surface in other areas. The present UK £20 note is an example of a banknote with a security thread embedded in this fashion, so as to be exposed in spaced windows. Since a banknote is approximately 100 microns thick, the variable spacing can cause detection problems when used with a read head which operates as shown in FIG. 1.

A second disadvantage of existing active read head systems for reading the type of narrow magnetic thread used for banknotes arises from the variable positioning of the threads. In the case of banknotes, this variability is introduced intentionally since perfectly aligned threads make it difficult for automated machinery to handle a stack of banknotes. For this reason a mechanised magnetic reader cannot readily pre-align the head with the thread, whilst a swipe reader may have difficulty in tracking a buried thread, which is difficult to see. Known active read heads have a track width of typically 1.4 mm, which can be difficult to align to a 2 mm wide thread. It is an object of the present invention to mitigate the above disadvantages.

SUMMARY OF THE INVENTION

According to the present invention there is provided a device for reading an elongate magnetic data carrier attached to or embedded in an article. The device comprises an active read head adapted to have a track width having a lateral extent greater than the width of the data carrier. The magnetic field produced by the read head in use results in a signal detected by the read head from said data carrier, which signal has an amplitude which varies by less than 50% for head to data carrier spacings of from 0 to 60 microns. The signal can have an amplitude which varies by less than 25% for head to data carrier spacings of from 0 to 60 microns. The present invention also relates to a swipe reader for magnetic data carriers (such as cards or documents) that include such a device.

A passive read head having similarities to the present invention is disclosed in U.S. Pat. No. 3,753,255. However, in this device the wide read head is simply employed to make overlap easier, as passive heads do not respond to a threshold signal level.

BRIEF DESCRIPTION OF THE DRAWINGS

Embodiments of the invention will now be described, by way of example only, with reference to the accompanying schematic drawings, in which.

DETAILED DESCRIPTION OF THE INVENTION

Figure 1:
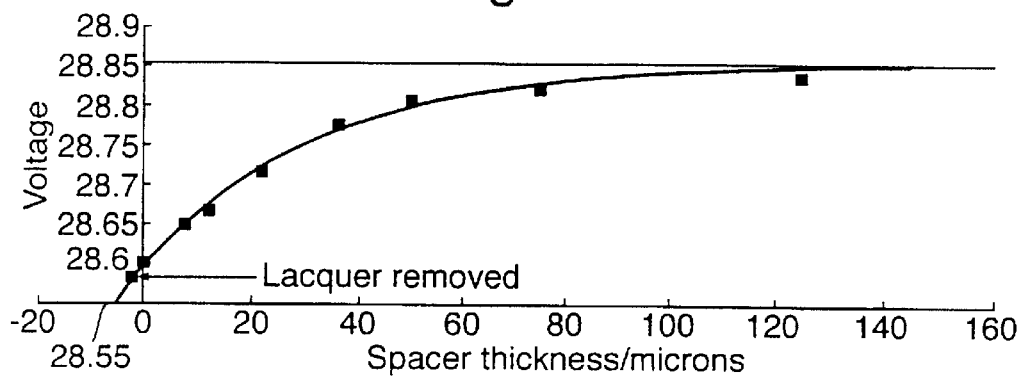
FIG. 1 shows a graph of the output voltage from a prior art read head as a function of spacing from a data carrier.
Figure 2:
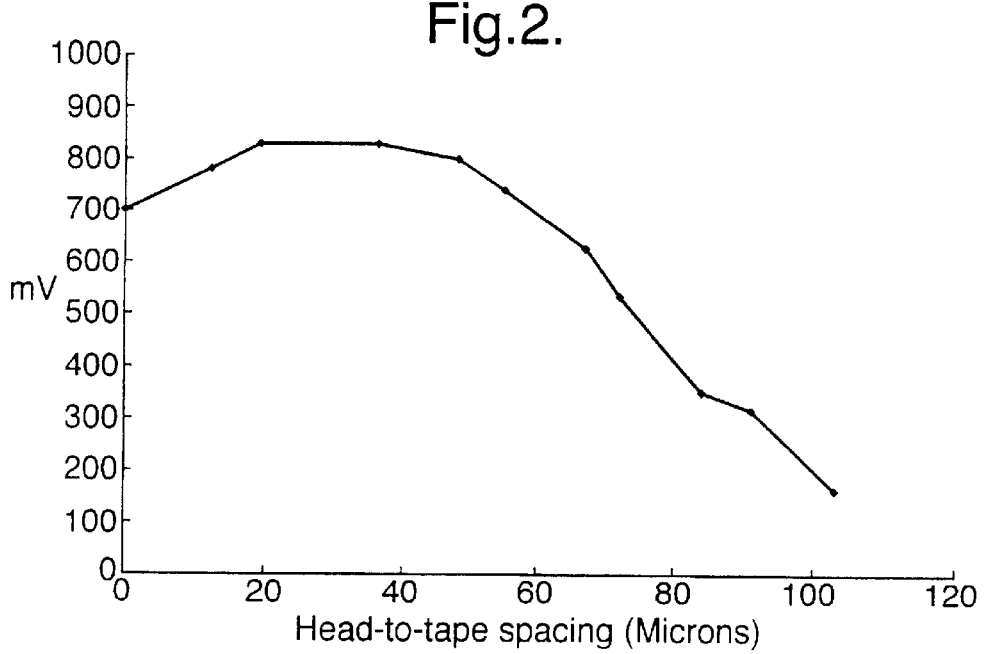
FIG. 2 shows a graph of the signal amplitude from a device according to the invention as a function of spacing from a data carrier.
Figure 3:
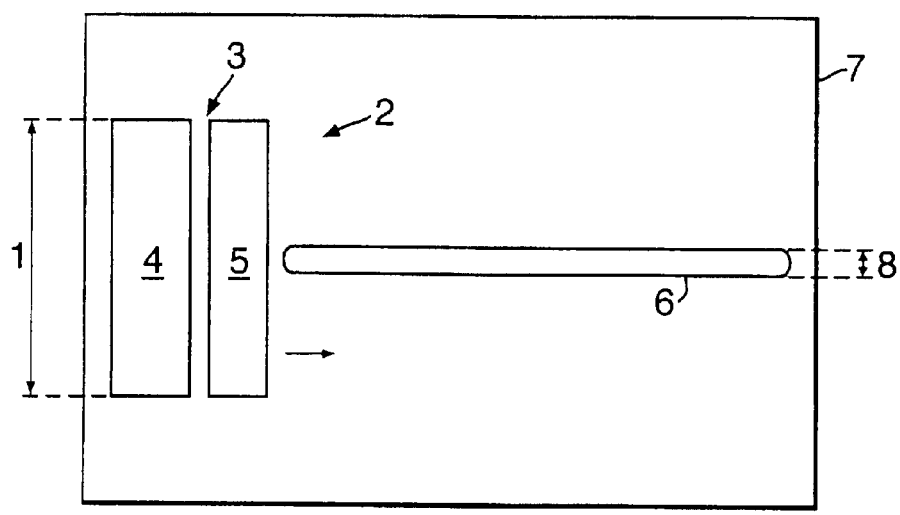
FIG. 3 shows a read head and data carrier according to the invention.

The experimental results displayed in FIG. 1 were obtained using a head track width of 1.4 mm and a data carrier consisting of a plastic card having magnetic tape 10 mm wide affixed to it. The experimental results shown in FIG. 2 were obtained using a read head according to the present invention as shown in FIG. 3. The track width (1) of the read head (2) was 8 mm, the gap (3) between pole pieces (4,5) was 50 microns, and the pole pieces were made of mumetal. A head excitation voltage of 72 V peak to peak was used, and the data carrier (6) was a length of WATERMARK tape 1.8 mm in width, which was affixed to a paper substrate (7). The excitation voltage was an a/c waveform oscillating at several tens of kHz.

The read head track width (1) is preferably greater than the data carrier width (8) by at least the positional uncertainty of the thread, so that a mechanical reading system may be used without further pre-alignment whilst still ensuring that the read head overlies the data carrier. Alternatively, it provides a greater positional tolerance for a swipe reader. Having a read head wider than the data carrier also makes the coupling between the data carrier and the read head substantially constant regardless of positional variation. This makes security features which rely on this property much more reliable. In addition, the fringing fields for a wide head are different to those for a narrow head, resulting in a greater signal being produced when the head is spaced from the data carrier in the case of the present invention. By increasing the energising field from the active read head, greater volumes of magnetic material will be magnetised at a greater distance. This compensates partly for the decrease in sensitivity with increasing spacing to the data carrier, resulting in the data shown in FIG. 2 in which the effective sensitivity of the read head is substantially constant over several tens of microns variation in spacing to the data carrier. With careful optimisation it is likely that the variation of sensitivity with spacing shown in FIG. 2 can be improved upon. The signal shown in FIG. 2 has an amplitude which varies by less than 50% (in fact in the present example by less than 25%) for head to data carrier spacings of from 0 to 60 microns.

The detection circuit for read heads according to the present invention will require slightly more gain than that employed for conventional narrow heads. This is because only a fraction of the wide head will be adjacent the narrow data carrier at any given time.

The active read head in the present invention is preferably adapted to have a track width having a lateral extent greater than twice (very preferrably greater than 4 times) the width of the data carrier.

The elongate data carrier may be attached or embedded in a substrate, document, ticket, card, banknote, or other article.

Finally, the priority document (particularly the drawings) and the abstract accompanying the present description is incorporated herein by reference.

What is claimed is:

1. In a system for reading an elongate magnetic data carrier attached to or embedded in an article, including a read head and a data carrier, the read head being adapted to have a track width having a lateral extent perpendicular to the direction of movement of the data carrier greater than the width of the said data carrier perpendicular to the direction of movement of the data carrier, the improvement comprising the read head being constituted by an active read head having means for providing an a/c energising magnetic field and a detection circuit arranged so that the active read head including the means for providing the a/c energising magnetic field and the detection circuit can be located on the same side of the data carrier, the lateral extent of the active read head being at least twice the lateral width of the data carrier, thereby producing a magnetic field which results in use in a signal, detected by said read head from said data carrier, having an amplitude which varies by less than 50% for head to data carrier spacings of from 0 to 60 microns.

2. In a system as claimed in claim 1, wherein the lateral extent of the active read head relative to the lateral extent of the data carrier being such that the signal detected by the active read head has an amplitude which varies by less than 25% for head to data carrier spacings of from 0 to 60 microns.

3. In a system as claimed in claim 1 wherein the lateral extent of the of the active read head is greater than four times the lateral width of the data carrier.

4. A swipe reader for magnetic data carriers comprising the system of claim 1.

* * * * *